No. 730,964. PATENTED JUNE 16, 1903.
J. A. PRESTWICH.
MEANS FOR EXHIBITING KINEMATOGRAPHIC PICTURES.
APPLICATION FILED DEC. 18, 1901.
NO MODEL. 3 SHEETS—SHEET 1.
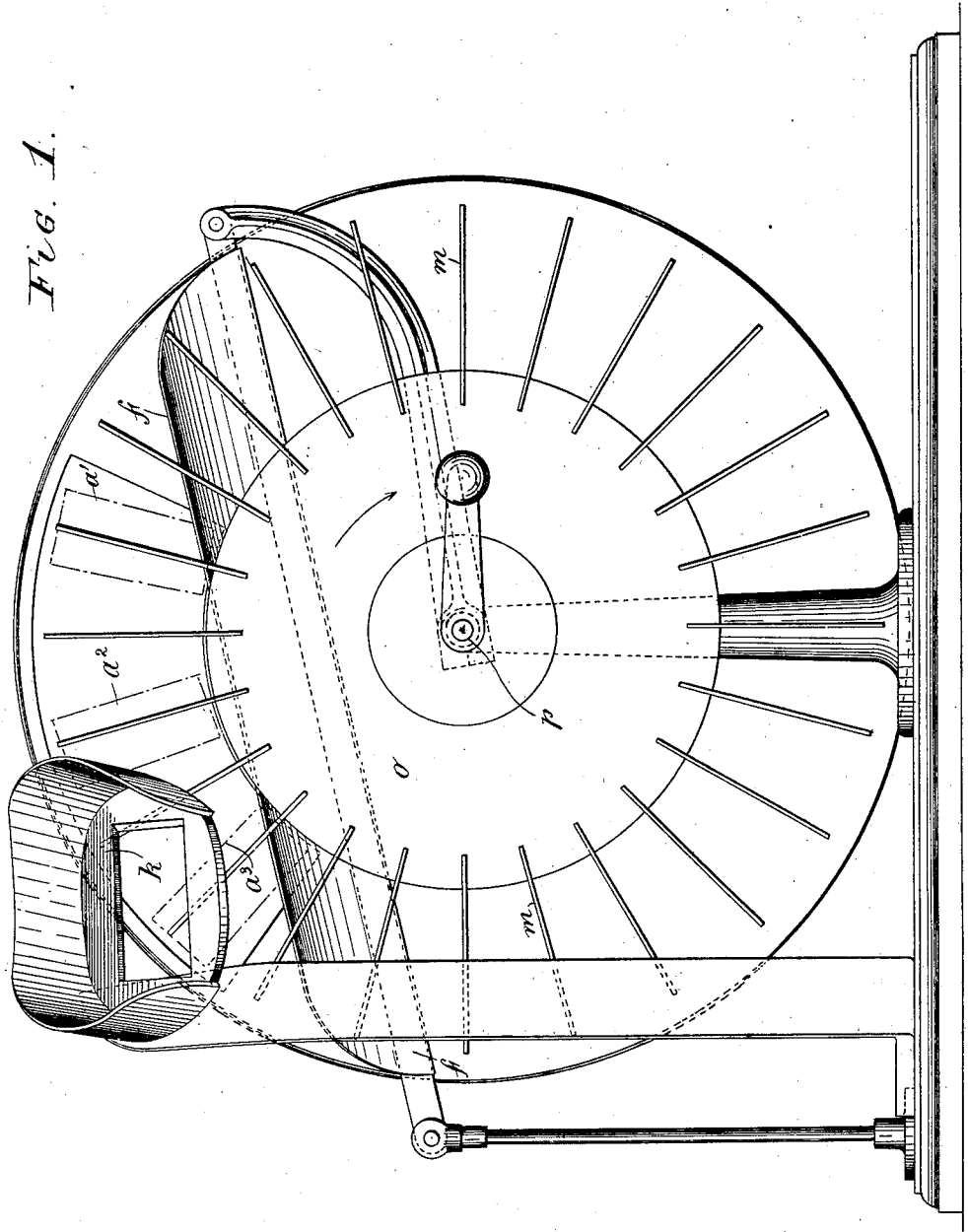

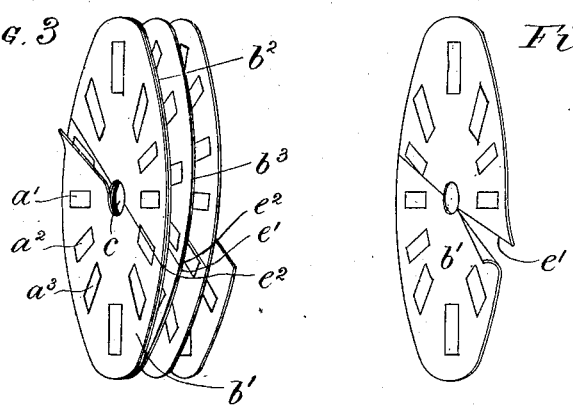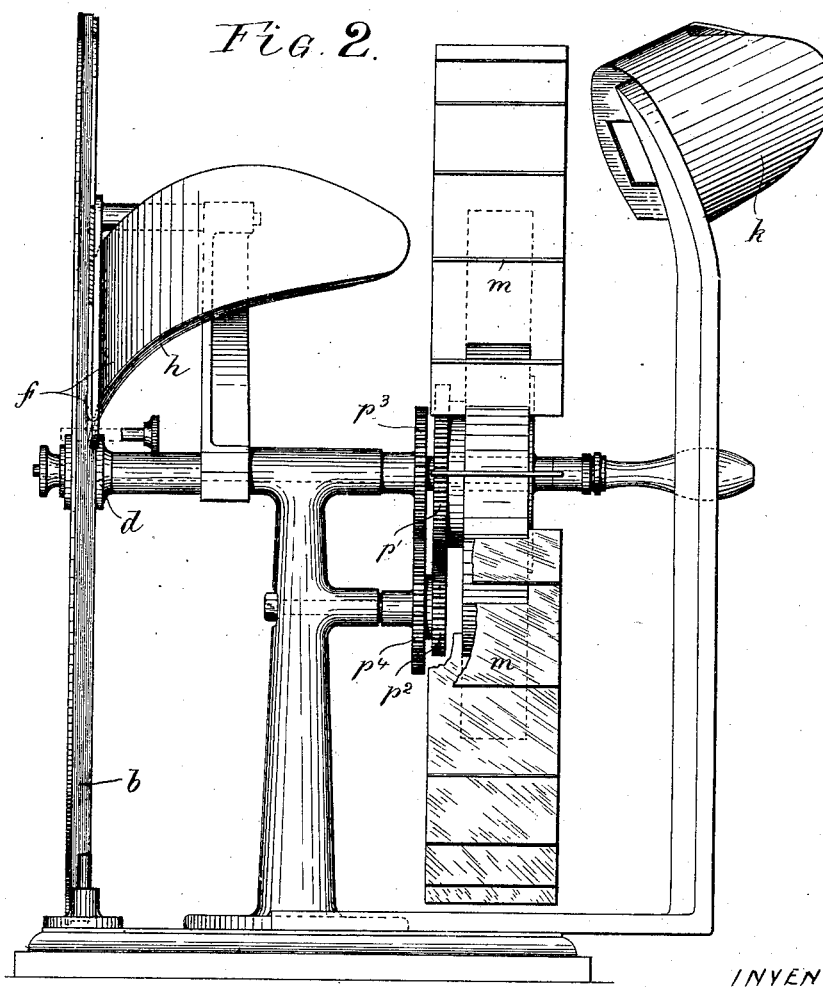

No. 730,964. PATENTED JUNE 16, 1903.
J. A. PRESTWICH.
MEANS FOR EXHIBITING KINEMATOGRAPHIC PICTURES.
APPLICATION FILED DEC. 18, 1901.
NO MODEL. 3 SHEETS—SHEET 3.

WITNESSES:
Fred White
Thomas F. Wallace

INVENTOR:
John Alfred Prestwich
By his Attorneys.
Arthur E. Fraser

No. 730,964. Patented June 16, 1903.

UNITED STATES PATENT OFFICE.

JOHN ALFRED PRESTWICH, OF TOTTENHAM, LONDON, ENGLAND.

MEANS FOR EXHIBITING KINEMATOGRAPHIC PICTURES.

SPECIFICATION forming part of Letters Patent No. 730,964, dated June 16, 1903.

Application filed December 18, 1901. Serial No. 86,402. (No model.)

*To all whom it may concern:*

Be it known that I, JOHN ALFRED PRESTWICH, engineer, of 30 St. Paul's road, Tottenham, in the county of London, England, have invented certain Improvements in the Means for Exhibiting Kinematographic Pictures, of which the following is a specification.

The object of this invention is to produce an improved and simple apparatus for exhibiting a series of kinematographic photographs or pictures in rapid succession to give the effect of animation.

By my invention I am enabled to employ pictures made by a cheap photographic process, and so reduce the great expense attending apparatus as at present made.

It is also my object to provide an optical means to render moving photographic pictures or prints apparently stationary without the defect of giving them an angular displacement and without causing the total optical distance between the picture and the eye of the observer to vary in length, so that the pictures will remain always in the same focus.

According to my invention I make the picture-holder in the form of a helical plane adapted when rotated on its axis to continuously present fresh surfaces and pictures at the point of observation. To render such picture apparently stationary, the said spiral or helical holder is moved about its axis intermittently to give each picture a period of rest, or the said helical holder is revolved at a uniform speed and each picture rendered apparently stationary by means of a moving shutter having a small slot in it, so that each picture is only seen for an instant during which time the picture would not move very perceptibly, or I may accomplish the same or a better effect by means of a moving lens, prism, or mirror, or a combination of one or more mirrors, prisms, or lenses.

I will now refer to the accompanying drawings, which illustrate one form of apparatus made in accordance with my invention, the casing being removed.

Figure 5:
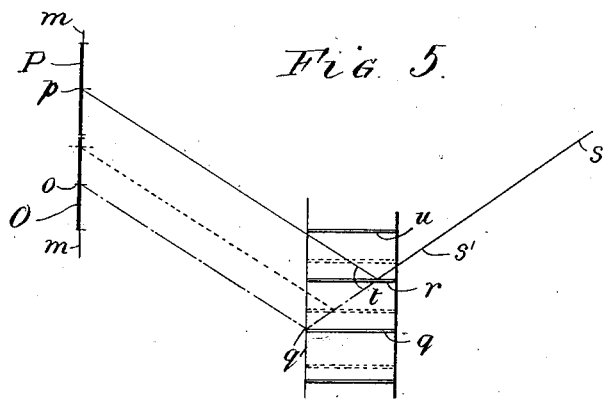
Figure 6:
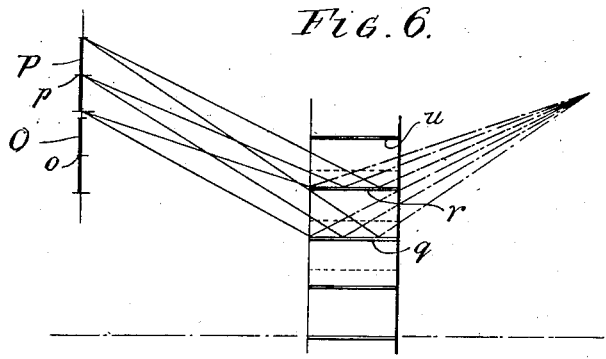
Figure 7:
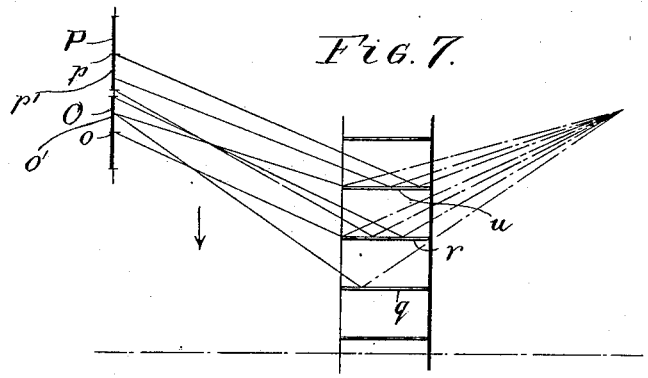

Figure 1 is a front elevation. Fig. 2 is a side elevation. Fig. 3 shows the helical picture-holder, and Fig. 4 shows a separate disk or blade of the picture-holder. Figs. 5, 6, and 7 are diagrammatic views illustrating the action of the mirrors.

Referring first to the construction of the helical picture-holder shown in Fig. 3, according to my invention I mount or print the pictures $a'$ $a^2$ $a^3$ in their proper sequence radially around the edge of circular disks $b'$ $b^2$ $b^3$, of paper or other suitable material. The paper disks $b'$ $b^2$ $b^3$ have a hole $c$ in the center, and they are mounted on a suitable boss or arbor $d$, Fig. 2. In forming the helical holder the disks, as shown separately in Fig. 4, are each cut radially from the outer edge to the center, and the one radial edge $e'$ of the first disk, say $b'$, is fastened to the opposite radial edge $e^2$ of the second, $b^2$. (See Fig. 3.) The other radial edge $e'$ of the second is fastened to the opposite radial edge $e^2$ of the third disk $b^3$, and so on till a kind of deep-threaded flexible screw of the required length is formed.

Referring now to Figs. 1 and 2, the series of disks or helical picture-holder described is mounted so that it can be rotated about its center on an axis at right angles to the flat or helical surface. A roller or guide $f$ is adapted to be placed under the leading edge of the first disk or helix. The whole of the blades of the helix and the pictures thereon will pass said guide or roller and be wound off, as it were. The disks being very flexible will yield, and the guide or plate bent to a suitable curve is placed in a suitable position to bend the disks, as at $h$, out of their original flat plane while they are revolving. The pictures will thus be exhibited in succession, but will be moving across the line of vision, said line of vision in this case being determined by an eye-shield $k$. To render each picture apparently stationary, this helical picture-holder may, as referred to, be moved about its center intermittently to give each picture a period of rest, or it may be revolved at a uniform rate and each picture rendered apparently stationary by means of a revolving shutter having a small slot in it, so that each picture is only seen for an instant, during which time the picture would not move very perceptibly, or according to my invention this effect may be accomplished by means of a reciprocating or revolving lens, prism, or mirror, or a combination of one or more mirrors $m$. In the form shown in the drawings the said mirrors are mounted radially on the edge of a revolving wheel $o$ and extend to about the same diameter as the paper disks. The reflecting-surfaces of the mirrors are parallel with the axis $p$, about which the wheel revolves. If the wheel $o$ and helical holder are mounted on the same spindle $p$ and geared together by wheels $p'$ $p^2$ $p^3$ $p^4$, so that the wheel $o$ travels half the number of revolutions in the same direction as the helical holder, the difference in the angular movement between the pictures $a'$ $a^2$ $a^3$ and mirrors $m$ will render each picture optically stationary to the observer, and as each mirror and its corresponding picture passes the line of vision of an observer, determined in this instance by the eye-shield $k$, the kinematographic pictures $a'$ $a^2$ $a^3$ will be exhibited in their proper sequence and give the required animation. In the construction shown the wheel $o$, carrying the mirrors $m$, is arranged to travel only half the rate of the disks, and is therefore provided with double the number of mirrors as there are pictures on each disk or blade of the helical holder. Two rows of pictures may be printed on each disk or blade of the helical holder for the purpose of giving stereoscopic effect, or pictures may be printed on both sides of the said disks or blades, so that the holder may be reversed and so serve to represent two different scenes. All other kinematographic apparatus or toys known to me in which a mirror or a series of mirrors have been used to render moving pictures apparently stationary suffer from the defect that the angular movement of the mirror or mirrors causes an angular displacement of the picture or causes the total optical distance between the picture and the eye to vary, and so alter the length of focus from the point of observation. The conditions necessary to avoid these defects are that the optical path of a light-ray from the eye to the mirror and from the mirror to the picture shall always fall on the same point in the picture, and the total length of the said path of any ray shall always be of the same length. I overcome this defect by causing the pictures and mirrors to travel a similar path, but the mirrors to move half the distance or half the speed and half the angle through such similar path in the same direction, the reflecting-surface of the mirrors always remaining at the same angle to the direction of the motion of the picture; so that if the picture moves in a circular or angular path the mirror moves through half the circular or angular path. If the pictures move through a straight line, as they do when they are mounted on a strip, the mirrors should move in a straight line, but at half the rate in the same direction and with the reflecting-surface at right angles to the plane in which the pictures move and to the direction of their movement. In describing how these conditions are obtained in this apparatus I will refer to Fig. 5, where the pictures or mirrors are assumed to be traveled in parallel paths. $m$ $m$ represents the plane of the picture; $o$ $p$, the centers of two pictures O and P; $q$ $r$ $u$, three mirrors. A ray $o$ $q'$ will be reflected by the mirror $q$ in the direction $q'$ $s'$ $s$, and a ray $p$ $t$ from mirror $r$ in the direction $t$ $s'$ $s$, and the optical path $p$ $t$ $s'$ $s$ coincides on leaving the mirror with the path $o$ $q'$ $s'$ $s$. It will thus be seen that the centers, and consequently the object in the pictures, are superimposed on the line of sight and are apparently stationary to the observer.

The dotted lines in Fig. 5 show the ray of light from the center $o$ of the picture O when the pictures and mirrors have moved to the dotted position, and from this it will be readily understood that the line of sight $s$ $s'$ always strikes the center of picture whatever the position the mirrors and pictures are in.

The progressive passage of the pictures in the mirrors is further illustrated in the diagrams Figs. 6 and 7, where in Fig. 6 the picture P is reflected to the observer in the two mirrors $q$ $r$. In Fig. 7 the pictures and mirrors have moved in the direction of the arrow, and the right top $o'$ of the picture O and the bottom half $p'$ of the picture P are seen in the three mirrors $q$ $r$ $u$.

Pictures mounted spirally on a revolving drum or cylinder or upon traveling bands may be rendered apparently stationary by the means described.

In a modified form the helical holder may be in the form of a drum having the pictures mounted flatwise around the outside face of the drum in a helical or spiral manner, and means will be provided for causing the drum to be rotated upon its axis and at the same time to be traveled longitudinally thereof at a speed proper for correctly exhibiting the pictures successively in the line of vision. In combining such an arrangement with mirrors such as described the said mirrors may be mounted upon an endless band passing over and driven by suitable drums driven at the proper speed in relation to the speed of the picture-holding drums to receive the required effect of animation.

What I claim, and desire to secure by Letters Patent, is—

1. The improved kinematographic apparatus comprising the combination of a helical picture-holder made from a series of flexible disks cut radially and having their cut edges joined respectively with the cut edges of similar disks on each side so as to form a deep-threaded screw with the pictures printed on the flat faces of the screw-blade near the circumference, a series of mirrors disposed at right angles to the plane of the pictures upon the helical holder and means for moving the helical holder and means for moving the mirrors, at such speed in regard to the helical holder that the pictures are rendered apparently stationary to the observer, substantially as set forth.

2. The improved kinematographic apparatus comprising the combination of a helical picture-holder made from a series of flexible disks cut radially and having their cut edges joined respectively with the cut edges of similar disks on each side so as to form a kind of deep-threaded screw with the pictures printed on the flat faces near the circumference, a series of mirrors mounted upon the circumference of a wheel and so that the reflecting-surfaces of said mirrors are at right angles to the plane of the pictures and to the line of motion of the picture, mechanism for rotating said wheel and the helical holder at the proper speed determined by the spacing of the mirrors in regard to the spacing of the pictures, a guide or shield for progressively displacing the disks forming the helical holder from the line of sight, means for enabling the operator to view the pictures in the mirrors at the proper angle, all substantially as and for the purpose set forth.

3. The improved kinematographic apparatus comprising the combination of a helical picture-holder made from a series of flexible disks cut radially and having their cut edges joined respectively with the cut edge of similar disks on each side so as to form a kind of deep-threaded screw with the pictures printed on the flat faces near the circumference, a series of mirrors mounted upon the circumference of a wheel and so that the reflecting-surfaces of said mirrors are at right angles to the plane of the pictures and to the line of motion of the picture, mechanism for rotating said wheel and the helical holder at the proper speed determined by the spacing of the mirrors in regard to the spacing of the pictures, means for progressively displacing the disks forming the helical holder from the line of sight, means for enabling the operator to view the pictures in the mirrors at the proper angle, all substantially as and for the purpose set forth.

4. In kinematographic apparatus the combination of a series of pictures, means for traveling the pictures in a circular path, a series of mirrors with their reflecting-surfaces disposed at right angles to the pictures and to the path in which the said pictures travel, and means for traveling the mirrors at half the speed of the pictures and in a like circular path to that traveled by the pictures.

5. The improved kinematographic apparatus comprising the combination of a series of pictures, means for traveling the said pictures, a series of mirrors with their reflecting-surfaces disposed at right angles to the pictures and to the path in which the pictures travel, and means for traveling the mirrors at half the speed of the pictures.

6. In kinematographic apparatus a series of pictures mounted upon the flat face of a continuous integral flexible blade forming a deep-threaded screw, and means for moving said blade so as to exhibit the pictures on the face thereof successively at a given point, means being provided for rendering said traveling pictures apparently stationary to the eye, all substantially as set forth.

7. In kinematographic apparatus a picture-holder made in the form of a continuous integral blade comprising a deep-threaded screw, the pictures being mounted on the flat face of the blade, as and for the purpose set forth.

8. In kinematographic apparatus a picture-holder made of flexible disks cut radially and having their cut edges joined with the cut edges of similar disks at each side so as to form substantially a deep-threaded screw with flexible blades upon which the pictures are carried.

9. In kinematographic apparatus a means for rendering a traveling series of pictures apparently stationary to the observer, comprising the combination of a traveling series of pictures, a series of mirrors, means for traveling said mirrors in a given time half the distance and through half the same angle and in the same direction as the pictures, the reflecting-surfaces of the mirrors being disposed at right angles to the pictures and to the direction of motion thereof.

10. In kinematographic apparatus a means for rendering a traveling series of pictures apparently stationary to the observer comprising a ray-diverting medium, means for causing the said ray-diverting medium to travel in a given time half the distance traveled by the pictures, and through half the same angle and in the same direction so that as the pictures and the ray-diverting medium are moved across the point of observation a given point in the picture is deflected to the eye of the observer along a constant line of sight whatever may be the relative position of the ray-diverting medium and the pictures.

In witness whereof I have hereunto signed my name in the presence of two subscribing witnesses.

JOHN ALFRED PRESTWICH.

Witnesses:
HENRY A. PRYOR,
ROBERT M. SPEARPOINT.